United States Patent

Fournier

[11] Patent Number: 5,819,527
[45] Date of Patent: Oct. 13, 1998

[54] ELECTRO/HYDRAULIC SYSTEM FOR A 2 DOOR THRUST REVERSER

[75] Inventor: Alain M. Fournier, Le Plessis Robinson, France

[73] Assignee: Societe de Construction des Avions Hurel-Dubois, Meudon-la-Foret, France

[21] Appl. No.: 567,157

[22] Filed: Dec. 5, 1995

[30] Foreign Application Priority Data

Sep. 13, 1995 [EP] European Pat. Off. ............. 95402068

[51] Int. Cl.⁶ ........................................................ F02K 3/02
[52] U.S. Cl. ................... 60/226.2; 60/39.091; 244/110 B
[58] Field of Search ............................. 60/226.2, 39.091; 294/110 B

[56] References Cited

U.S. PATENT DOCUMENTS

| | | |
|---|---|---|
| 2,780,057 | 2/1957 | Stavert . |
| 4,422,605 | 12/1983 | Fage . |
| 4,424,669 | 1/1984 | Fage . |
| 4,671,460 | 6/1987 | Kennedy et al. . |
| 5,120,004 | 6/1992 | Matthias . |
| 5,224,342 | 7/1993 | Lair . |
| 5,310,117 | 5/1994 | Fage et al. . |
| 5,404,714 | 4/1995 | Davies ................................... 60/226.2 |
| 5,448,884 | 9/1995 | Repp ..................................... 60/226.2 |

FOREIGN PATENT DOCUMENTS

| | | |
|---|---|---|
| 0 542 611 | 5/1993 | European Pat. Off. . |
| 0 646 718 | 4/1995 | European Pat. Off. . |
| 2 601 077 | 10/1988 | France . |
| 782679 | 9/1957 | United Kingdom . |
| 9210917 | 3/1963 | United Kingdom . |

*Primary Examiner*—Charles G. Freay
*Attorney, Agent, or Firm*—Young & Thompson

[57] ABSTRACT

A thrust reverser for a turbo-fan engine having an improved system for security against inflight inadvertent deployment. The reverser has two pivoting doors for use on engines mounted on an aircraft rear fuselage or under the aircraft wing. The pivoting doors are positioned forward of an aft ring structure that is essentially the nacelle exit nozzle in forward thrust mode. The pivoting doors are actuated by a hydraulic actuator and are locked and unlocked by hook locks operated by an electric solenoid on one side of the door and a small hydraulic actuator on the opposite side. The two locking systems are completely independent, thereby assuring that an inadvertent in-flight deployment will not occur as a result from failure, faulty command or maintenance malpractice.

2 Claims, 6 Drawing Sheets

ELECTRO/HYDRAULIC SYSTEM FOR A 2 DOOR THRUST REVERSER

BACKGROUND OF THE INVENTION

This invention relates to a thrust reverser for turbo-fan engines used on aircraft. More particularly this invention relates to an improved system which ensures that an in-flight inadvertent deployment will not occur.

For turbo-fan engines, the thrust reverser is provided to reduce the stopping distance of the aircraft and to increase safety when landing on a wet or icy runway.

This invention applies particularly to thrust reversers comprised of two pivoting doors that pivot about axes, from a stowed position to a deployed position. When deployed the doors block the flow of one or both flows and eject the flow in a forward direction.

The reverser is only intended for ground use, and because of the effect of the reverse thrust propulsion forces, in-flight deployment can result in aircraft instability and loss of control.

In order to obtain added security against in-flight faulty command, maintenance malpractice or deployment due to failures, improved system locking must be developed to provide additional margins of safety.

The primary object of this invention is to provide positive locking through at least two independent systems which will thereby prevent any inadvertent in-flight deployment.

In known thrust reverser systems, two typical pivoting door reversers are described by FAGE in U.S. Pat. No. 4,422,605 (FR-A-2.494.775) and U.S. Pat. No. 4,424,669 (FR-A-2.500.537).

Other similar designs are disclosed by LAIR in U.S. Pat. No. 5,224,342 and FAGE again in U.S. Pat. No. 5,310,117. For these particular thrust reversers, the locking mechanism is comprised of two hooks per door, released by a hydraulic actuator on each side of the door.

The pivoting doors are deployed and stowed by a large hydraulic actuator installed on one side of the two doors. Thrust reversers of this known type are illustrated in FIG. 1.

The aforementioned designs have control systems where the main actuator and the two separate hook locks are hydraulically actuated through a common line and selector valve.

A disadvantage of the prior art described, resides in the fact that a faulty command or a maintenance error can result in an in-flight deployment. It has been experienced on recent incidents that a pressure build up due to a hydraulic leak can result in a system command to the deploy mode, without pilot permission. The way to prevent this is to have two independent locking systems. One being commanded hydraulically by the engine control system, and the other going to the cockpit to be electrically controlled by the pilot.

Another cause of an inadvertent deployment is the eventual loss of a pivoting door, by a failure of the door pivot bolt or fitting. The aforementioned design, which has the pivot bolt fitting integrated into the main actuator, does not provide the safety requirements of the certification agencies, in that the pivoting door could break loose as a result of buffeting if the pivot bolt failed, or if a bolt was poorly installed due to maintenance malpractice.

Other examples of prior art are disclosed by STAVERT in U.S. Pat. No. 2,780,057 and MATHIAS in U.S. Pat. No. 5,120,004, and CRIFFIELD in GB-921.917. These known control systems rely on hooks and mechanical linkages that are actuated through a common supply line and selector valve. The door and pivot bolts are located at the exit nozzle with no aft ring that entraps the rear of the doors. The prior art system of CRIFFIELD is illustrated by FIG. 2, and the hook referred to as H.

Therefore these known systems do not provide the adequate safety required for a modern aircraft.

In FR-A-2.601.077, KENNEDY describes a pivoting door reverser, that is forward mounted, with an aft ring exit nozzle.

This design is an improvement, but still has the main actuator for deploy and stow, and two separate hook locks, all actuated through a common supply line and hydraulic selector valve. Therefore, a need for improved safety is required.

The object of the present invention is to protect against the aforementioned disadvantages by offering a design that combines three basic principles.

The first is to position the main actuator in the center of the door, with a safety lock integrated.

The second is to have two independent locking systems, one being hydraulic, the other being electric on each door.

The third is to have an aft ring exit nozzle that entraps the rear portion of the pivoting door during the stow or cruise mode. This is illustrated in FIGS. 8 and 9.

SUMMARY OF THE INVENTION

The present invention overcomes the above-described problems by providing an improved security system against in-flight inadvertent deployment.

More particularly, the invention provides a thrust reverser for a turbo-fan engine with mixed hot and cold airflow, said thrust reverser being mounted on the aft fuselage of an aircraft and comprising:

an engine casing having lateral beams and two radially spaced openings, one being above, the other being below the engine axis;

two thrust reversing pivoting doors, installed in the casing openings, pivotally mounted around two axes supported by the casing lateral beams, said doors being movable from a stowed position in which they do not interfere with the mixed airflow to a deployed position in which they block the mixed airflow and direct it in a forward direction;

a hydraulically actuated pivoting door actuator attached to the center of each pivoting door for moving the door from said stowed position to said deployed position, a hydraulically actuated piston-driven S-hook lock on one side of the doors, that retains the pivoting doors in the stowed position, and an electrical solenoid operated S-hook lock on the opposite side of the pivoting doors.

Contained within the actuator, is a snubbing mechanism that prevents the doors from butting against each other when in the deployed position.

Preferably, two pivoting doors are located forward of an aft ring exit nozzle. Each door is deployed and stowed by its own hydraulic actuator positioned in the center of the door. The actuator is controlled by the hydraulic selector valve which receives its commands from the engine electronic control unit.

In the forward thrust position the two pivoting doors are locked in position by four hook locks. Each door has two hook locks, sometimes referred to as S-hooks. These hook locks are shaped like an S with a pivot point in the center. One S-hook can thereby latch two doors.

The hook locks are released simultaneously, by two independent circuits. The right side is released by a hydraulic actuator in the circuit of the hydraulic selector valve and the engine electronic control unit. The left side S-hook is released by a solenoid energized by an electric circuit from the cockpit.

DETAILED DESCRIPTION OF THE INVENTION

Figure 1:
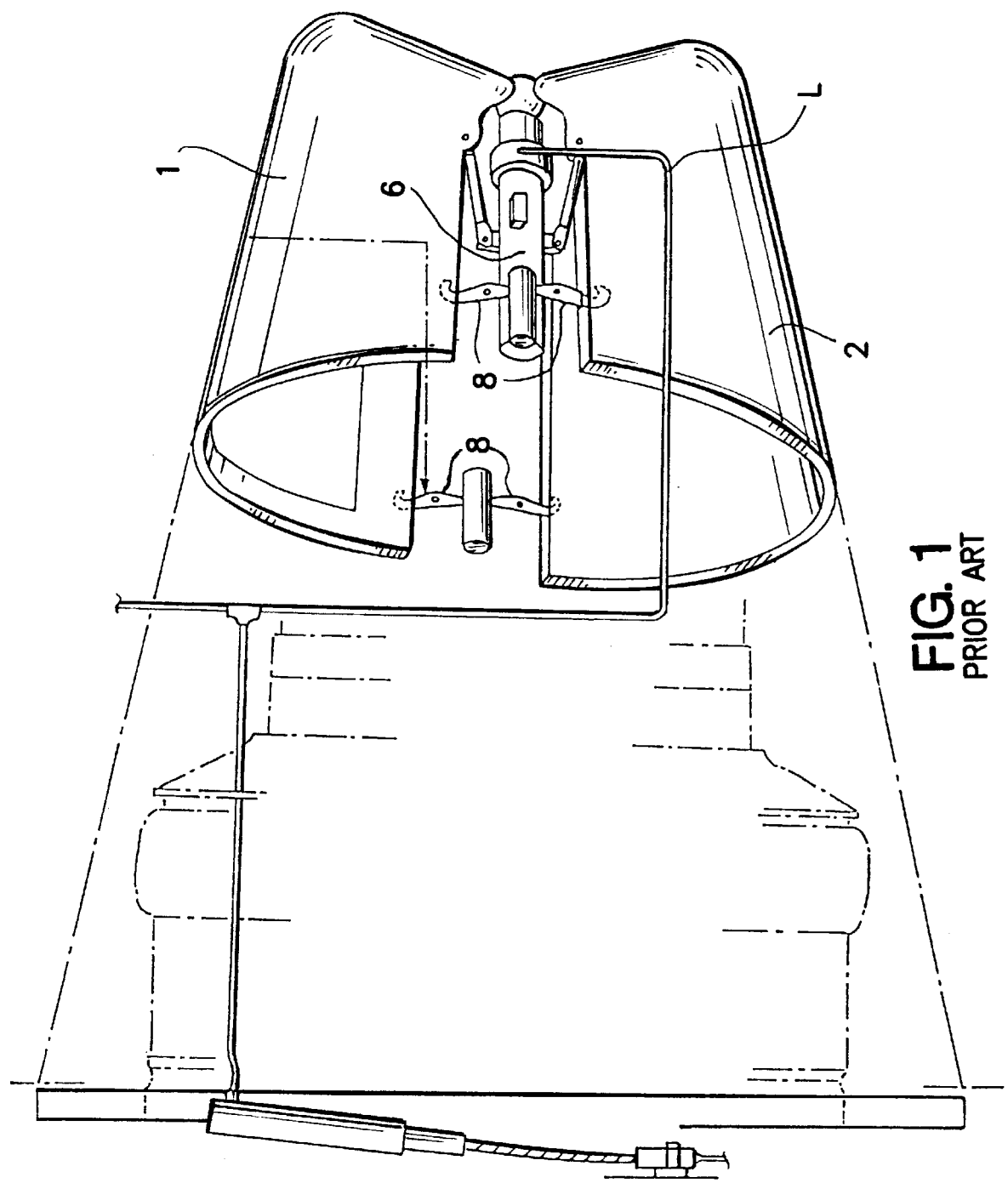
FIG. 1 is a perspective view of a known two door type reverser with two locks per door.

Referring to FIG. 1 there is seen a typical two-door thrust reverser for a turbofan engine. It is clearly shown that the main actuator 6 is located on the lateral side and this actuator along with the two hook locks 8 per door 1,2 are all actuated through a common supply line L.

It is also shown in this prior art system that there is no aft ring structure aft of the pivoting door trailing edge.

Figure 2:
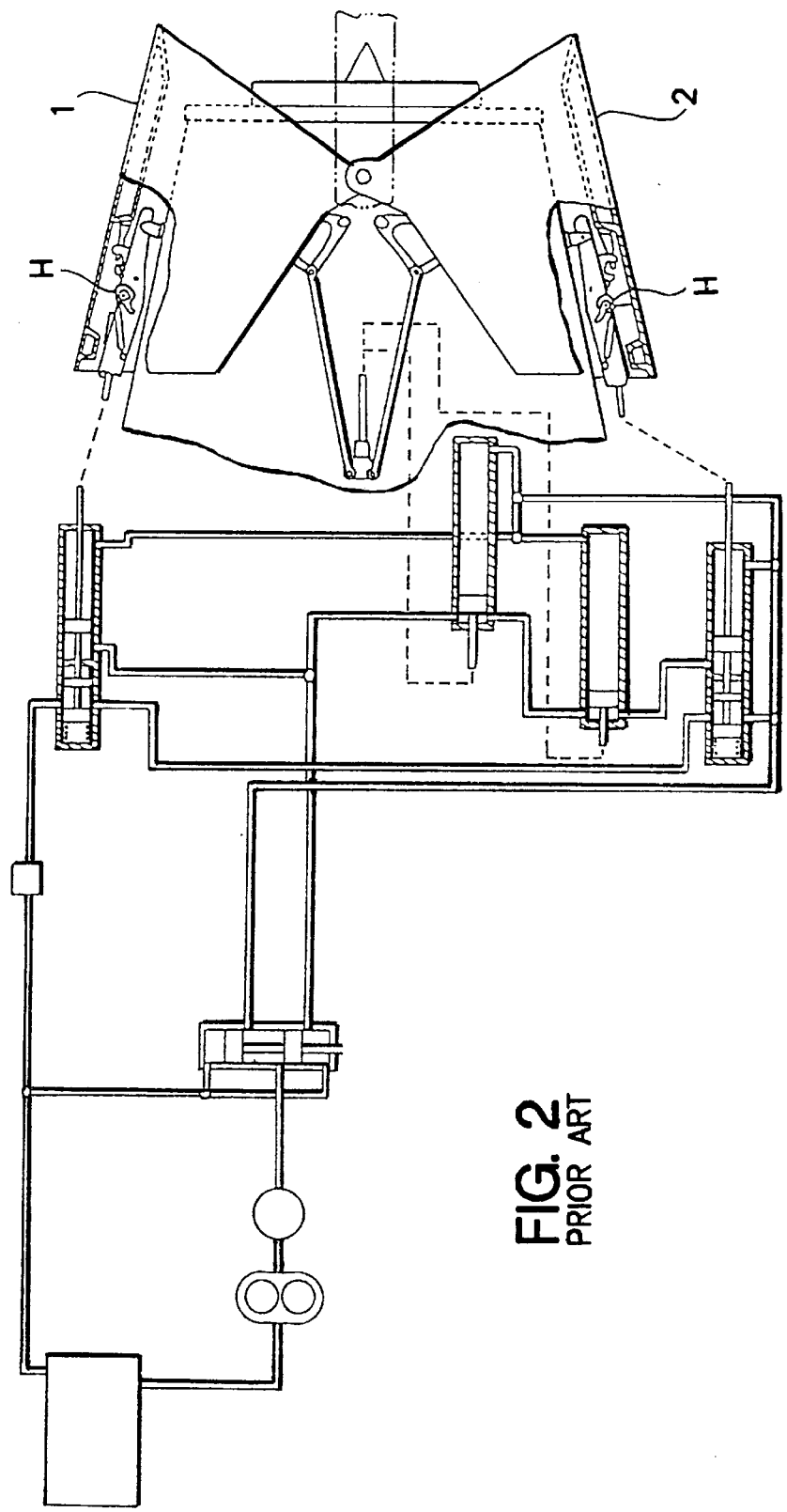
FIG. 2 is a perspective view of a known two door type reverser with one lock per door.

Referring to FIG. 2 there is seen another known two door reverser, with only one hook lock H per door 1, 2.

It is also shown in this prior art that there is no aft ring structure aft of the pivoting door trailing edge.

Figure 3:
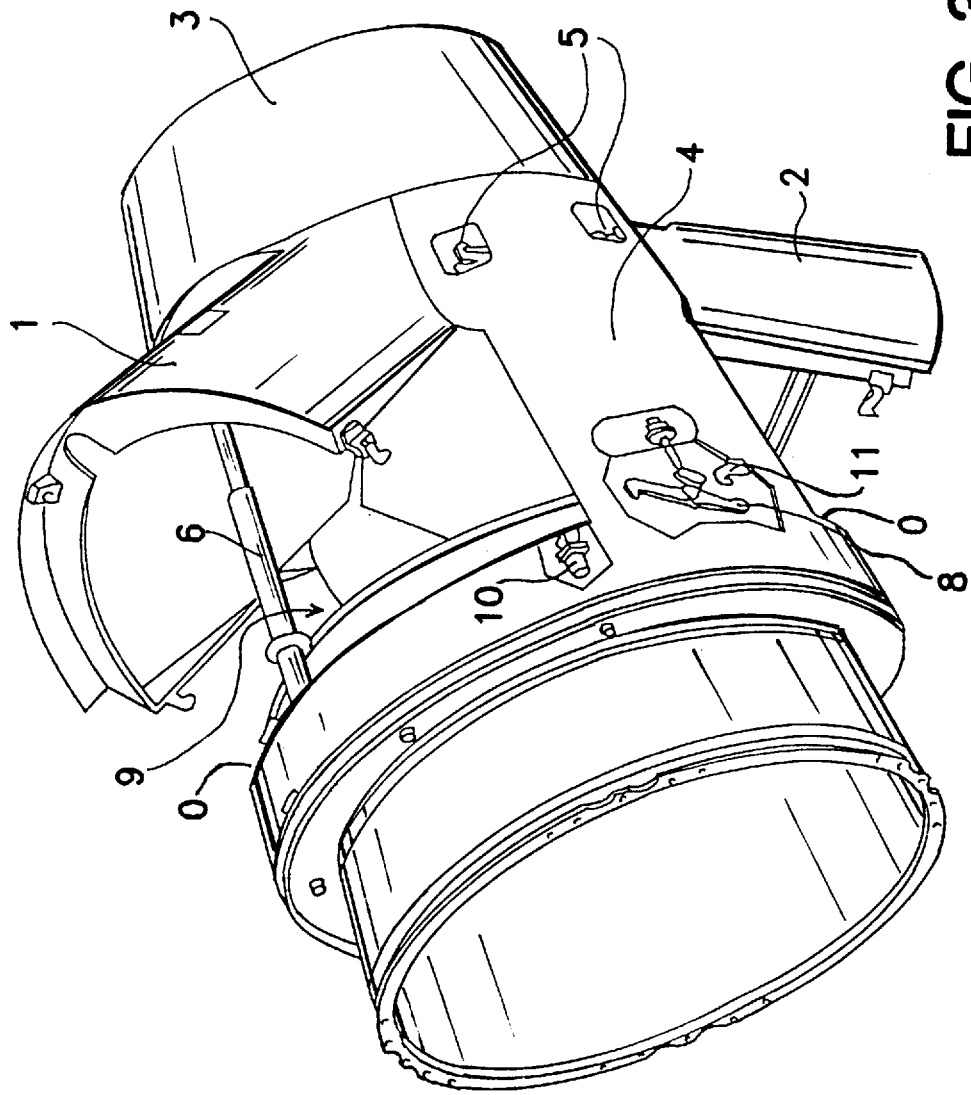
FIG. 3 is a perspective view of the thrust reverser corresponding to the present invention.

Referring now to FIG. 3 we see the thrust reverser corresponding to the present invention. This reverser is comprised of an upper pivoting door 1 and a lower pivoting door 2, installed in corresponding openings O provided in the casing, and an aft ring structure 3 which is essentially the nacelle exit nozzle in forward thrust mode. This aft ring structure is attached to the two side beams 4.

The two pivoting doors 1,2 pivot around the pivot axes 5, through fittings installed in the side beams 4.

Figure 4:
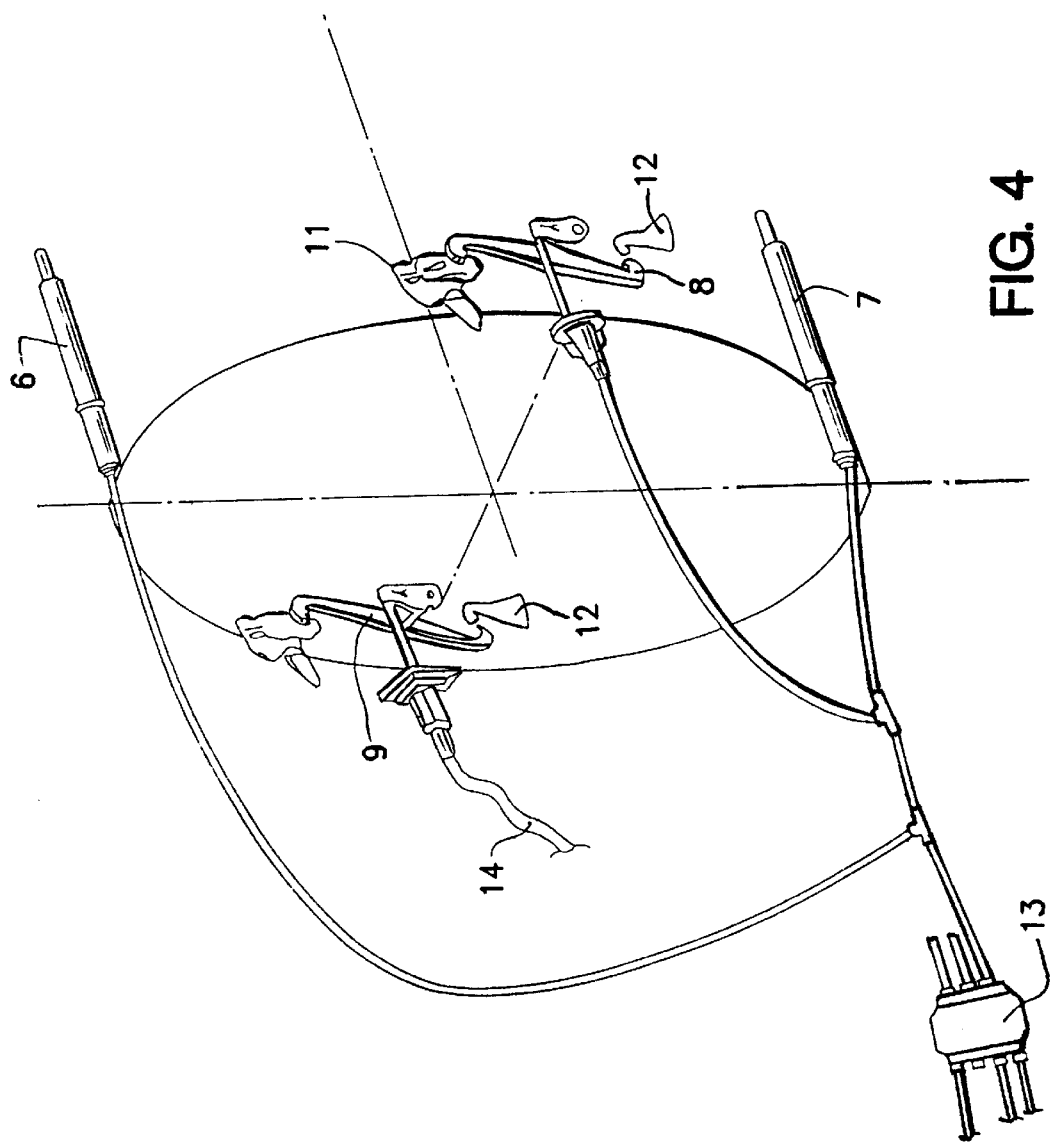
FIG. 4 is a perspective view of the thrust reverser isolated system components.

The actuation system is comprised of an upper door main actuator 6 and a lower door main actuator 7 (FIG. 4). These actuators are located on the vertical center line of the thrust reverser and are attached to the center of the doors.

Two independent S-hook locks 8,9 (FIG. 4) are installed in the side beams 4, to lock the pivoting doors 1,2 in the stow position.

The left side S-hook lock 8 is hydraulically actuated by the same circuit as the main pivoting door actuator 7. The right side S-hook lock 9 is operated by an electric solenoid energized from the pilot 14 and independent from the S-hook lock 8 that is actuated through the hydraulic selector valve 13 and the engine electronic control system.

Figure 7:
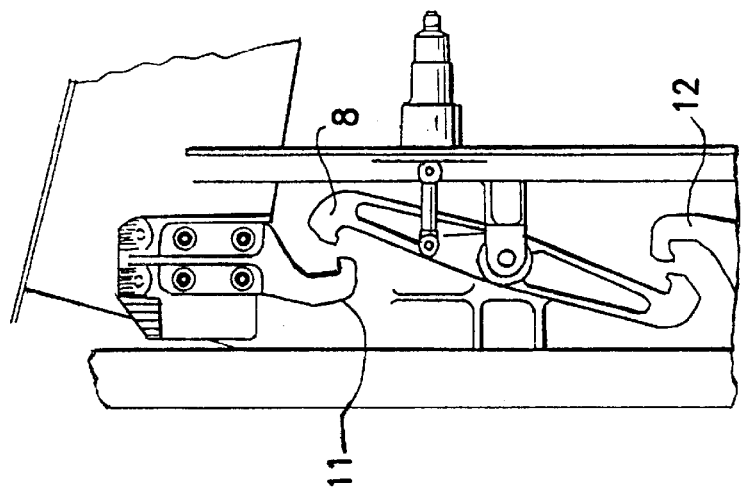
FIG. 7 is a side view of the S-hook lock and pivoting door latch.
Figure 6:
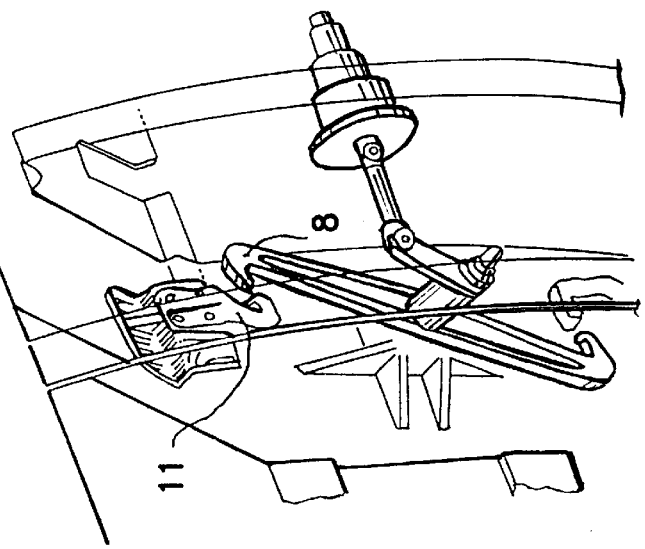
FIG. 6 is a perspective view of the S-hook lock and hydraulic piston actuation.
Figure 5:
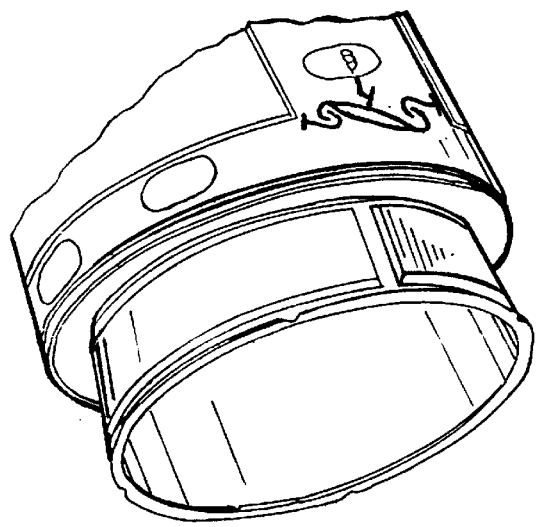
FIG. 5 is a partial perspective view of the S-hook lock installation.

The stow switch 10 is shown in FIG. 3. When the door is unlocked, this switch 10 gives an unlock indication to the pilot 14. FIGS. 5, 6 and 7 show additional details of the S-hook locks. The upper and lower pivoting door latches, respectively 11 and 12, are also shown. It can be seen that the hooks on both sides of the doors are a single piece unit that engages both the upper door latch 11 and lower door latch 12 simultaneously.

Figure 9:
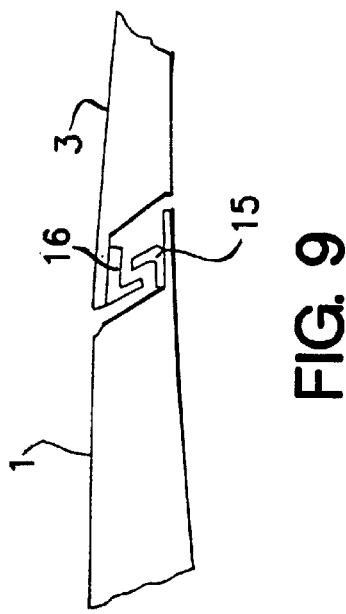
FIG. 9 is a side view detailing the safety catch that prevents the door from departing from the aft ring structure.
Figure 8:
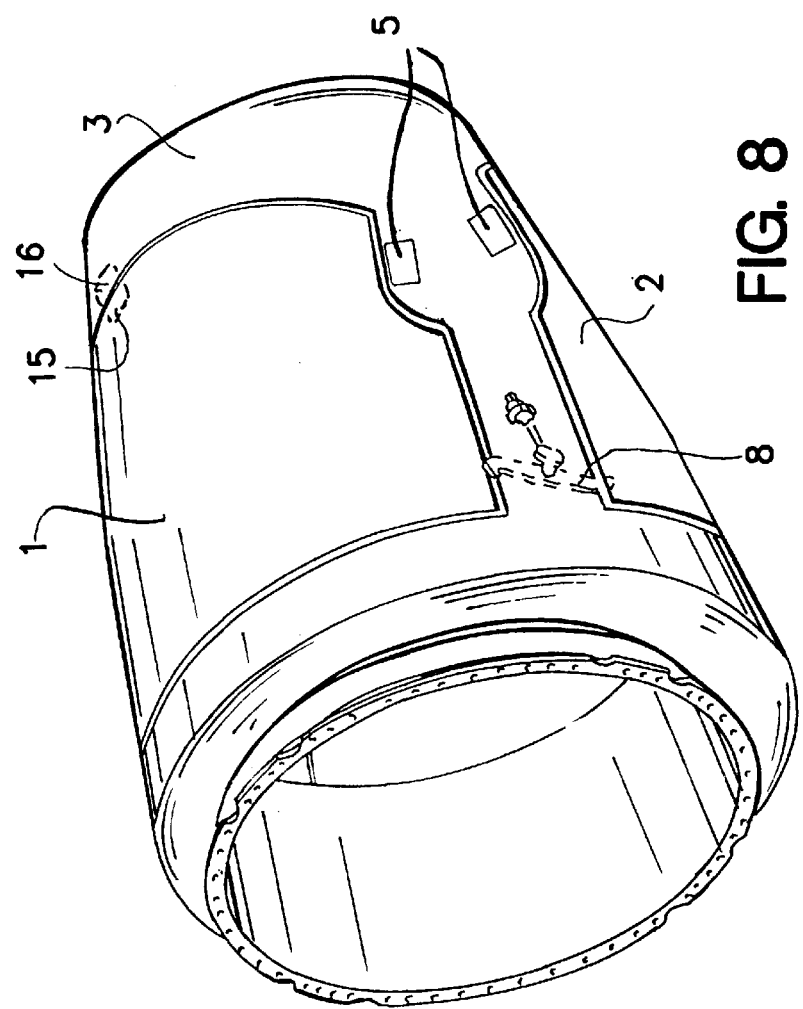
FIG. 8 is a perspective view of the thrust reverser assembly.

In FIGS. 8 and 9 the pivoting door aft catch fitting 15 is shown interlocking with the aft ring structure catch fitting 16.

The catch fitting 15 and 16 entrap the rear portion of the pivoting door, during stow mode in the event of a pivot bolt or fitting failure.

Thus, it will be seen that the described thrust reverser system of the present invention improves the security against inadvertent in-flight deployment.

We claim:

1. A thrust reverser for a turbo-fan engine with mixed hot and cold airflow, said thrust reverser being mounted on the aft fuselage of an aircraft and comprising:

an engine casing having lateral beams and two radially spaced openings, one being above, the other being below the engine axis;

two thrust reversing pivoting doors, installed in the casing openings, pivotally mounted around two axes supported by the casing lateral beams, said doors being movable from a stowed position in which they do not interfere with the mixed airflow to a deployed position in which they block the mixed airflow and direct it in a forward direction;

a hydraulically actuated pivoting door actuator attached to the center of each pivoting door for moving the said door from said stowed position to said deployed position, a hydraulically actuated piston driven S-hook lock on one side of the doors, that retains the pivoting doors in the stowed position, and an electrical solenoid operated S-hook lock on the opposite side of the pivoting doors.

2. A thrust reverser for a turbo-fan engine with mixed hot and cold airflow, said thrust reverser being mounted on the aft fuselage of an aircraft and comprising:

an engine casing having lateral beams and two radially spaced openings, one being above, the other being below the engine axis;

two thrust reversing pivoting doors, installed in the casing openings, pivotally mounted around two axes supported by the casing lateral beams, said doors being movable from a stowed position in which they do not interfere with the mixed airflow to a deployed position in which they block the mixed airflow and direct it in a forward direction;

a hydraulically actuated pivoting door actuator attached to the center of each pivoting door for moving the said door from said stowed position to said deployed position, a hydraulically actuated piston driven S-hook lock on one side of the doors, that retains the pivoting doors in the stowed position, and an electrical solenoid operated S-hook lock on the opposite side of the pivoting doors, said two pivoting doors being installed forward of an aft ring exit nozzle structure, with a safety catch fitting on the rear of the pivoting door, interlocking with a safety catch fitting on the aft ring structure, to entrap the rear part of the said door in the event of at least one of structural attachment failure and maintenance malpractice during installation of the said door and pivot bolt.

* * * * *